United States Patent [19]
Johnson et al.

[11] Patent Number: 6,104,807
[45] Date of Patent: Aug. 15, 2000

[54] DISPLAY-BASED ADD-ON MODULE

[75] Inventors: John Irving Johnson, Kinburn; Paul John Koens, Ashton; Dean Boggia, Kanata, all of Canada

[73] Assignee: Nortel Networks Corporation, Montreal, Canada

[21] Appl. No.: 09/028,512

[22] Filed: Feb. 23, 1998

[51] Int. Cl.$^7$ ................................................ H04M 1/00
[52] U.S. Cl. ............................................................ 379/428
[58] Field of Search ............................. 379/428, 49, 447, 379/433, 441

[56] References Cited

U.S. PATENT DOCUMENTS

| | | | |
|---|---|---|---|
| 4,375,584 | 3/1983 | Muzumdar et al. | 379/428 |
| 5,373,556 | 12/1994 | Johnson | 379/428 |

*Primary Examiner*—Jack Chiang

[57] ABSTRACT

An attachable module for expanding or enhancing the functionality of a desktop telephone terminal is disclosed. The module comprises a body on which are mounted a display, a plurality of function keys and a scroll key, all of which are connected to electronic circuitry housed within the body. An appendage projects from the body and comprises a pair of upwardly extending toothed protrusions and an electrical connector. The protrusions and electrical connector are intended to mate respectively with a pair of complementary cavities and a complementary electrical connector located in the underside of the terminal. The appendage is comprised of several sections of varying dimensions, yielding a structure that, in combination with the body of the module, provides a strong and stable mechanical connection when the module attached to the terminal. Operationally, the module can increase the size of a "speed call" list, increase the number of external lines available at the touch of a button and increase the number of other functions accessible by pressing a single function key. The scroll key allows the user to browse through pages of functions when their number exceeds the number of function keys on the module.

49 Claims, 6 Drawing Sheets

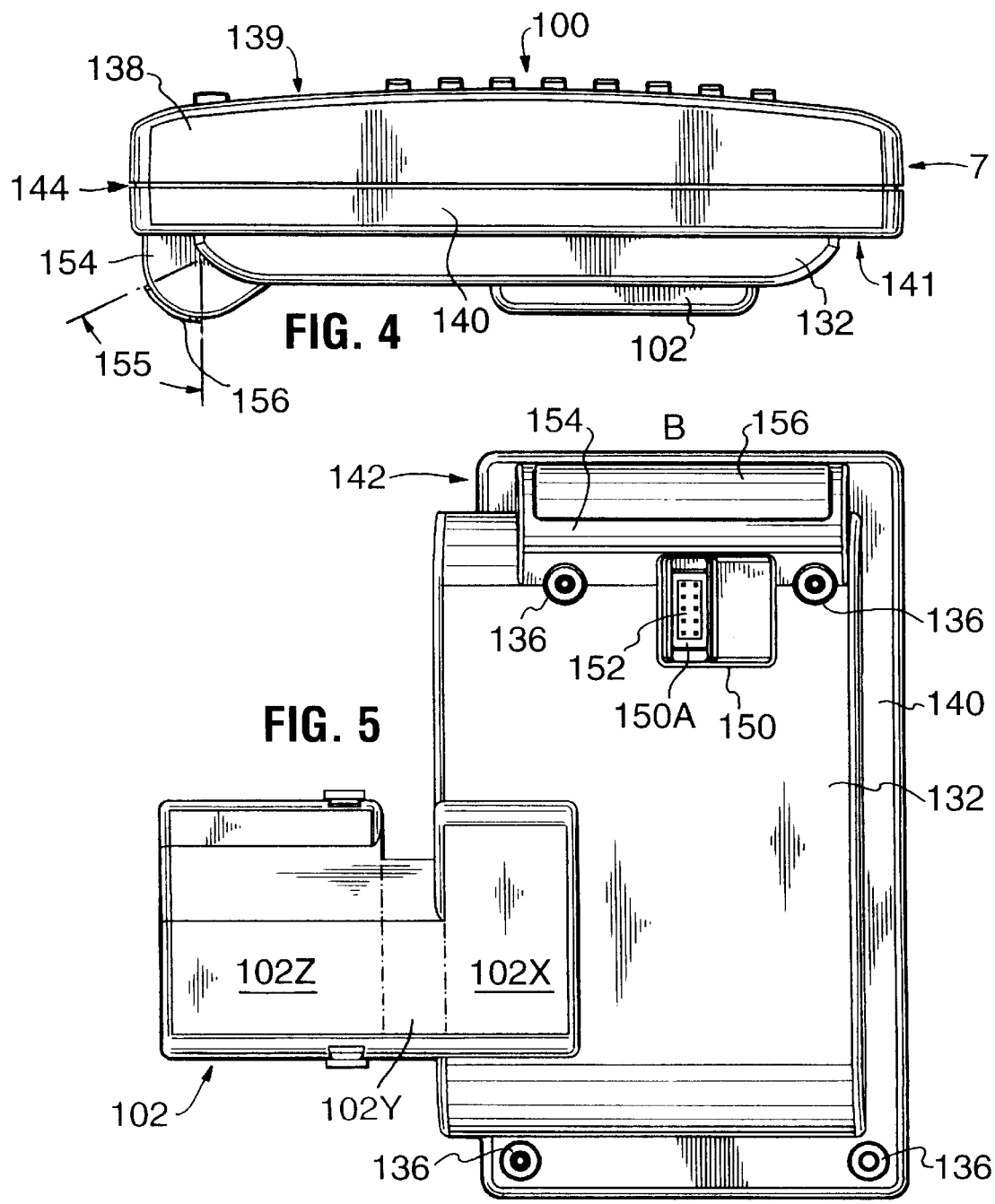

DISPLAY-BASED ADD-ON MODULE

FIELD OF THE INVENTION

The present invention relates to telephone terminals, and particularly to a display-based add-on module for a desktop telephone terminal.

BACKGROUND OF THE INVENTION

Users of desktop telephone terminals often find it convenient to access a frequently dialled number by touching relatively few buttons (or keys) on the keypad, a technique known in the art as speed calling. In situations where multiple telephone lines are available at a single terminal, it is also considered efficient to be able to access a particular line by depressing a single key corresponding to the desired line. Furthermore, with an ever increasing number of features available to users of desktop terminals, such as conference call, call park, call forward and automatic redial, users find it beneficial when these features are available at the touch of a button.

Such issues have been at least partially considered by manufacturers of modern desktop terminals, having given rise to a variety of designs of attachable (or add-on) modules attempting to satisfy today's user. A simple solution involves so-called keycap labelling, whereby a certain number of buttons on the module are reserved for speed calling, multiple lines and distinct features. At the time of manufacture of the add-on module, the actual telephony function of each of the reserved buttons is imprinted on the button itself.

Although it permits easy access to several functions in addition to those already available on the terminal, this implementation suffers from being inflexible and inefficient. For example, the mapping which associates each "speed call" button with a particular person's number must be recorded by the user of the module, either in memory or elsewhere. Moreover, it is generally impossible to increase the number of functions beyond the number of keys available on the module, or to re-map particular buttons to specific functions.

Another design, known in the art as paper strip labelling, permits the user to associate personalized information with each button by simply writing this information on a piece of paper and inserting it in a pocket on the button proper. More sophisticated attachable modules employing this design also allow the user of a module to assign each available key to any available function, and to reconfigure this mapping at will.

However, it is still a problem to access a number of telephony functions in excess of the number of keys on the module. Furthermore, hidden costs await the user or telephone provider as new labels of an adequate size must be printed upon modification of features, line numbers or the names of people on the speed call list. Clearly, any gain in flexibility is more than offset by additional maintenance requirements.

It would therefore be desirable to increase the capability and flexibility of a desktop terminal through the provision of a cost-efficient and maintenance-free display-based attachable module offering one-button access to various telephony functions.

SUMMARY OF THE INVENTION

It is an object of the present invention to mitigate or obviate one or more disadvantages of the prior art.

Therefore, the invention may be summarized according to a first broad aspect as an attachable module for expanding or enhancing the functionality of a telephone terminal which contains electronic circuitry, the module comprising: a body having an upper surface and a lower surface; electronic circuitry housed within the body and consisting of at least one microprocessor running software; a plurality of function keys mounted in the upper surface of the body and electrically connected to the electronic circuitry of the module; a page scroll key mounted in the upper surface of the body and electrically connected to the electronic circuitry of the module; a display mounted in the upper surface of the body and electrically connected to the electronic circuitry of the module; an appendage for physically connecting the module to the terminal; and an electrical connector for electrically connecting the electronic circuitry of the module to the electronic circuitry of the terminal.

The invention may be summarized according to a second broad aspect as a telephone system comprising: a telephone terminal having a body comprising an upper surface and a lower surface; electronic circuitry housed within the body of the terminal; a plurality of keys mounted in the upper surface of the body of the terminal and electrically connected to the electronic circuitry of the terminal; a display mounted in the upper surface of the body of the terminal and electrically connected to the electronic circuitry of the terminal; an electrical connector electrically connected the electronic circuitry of the terminal for electrical connection to a supplemental module; and cavity means on an underside of the terminal; and an attachable module having a body comprising an upper surface and a lower surface; electronic circuitry housed within the body of the module; a plurality of function keys mounted in the upper surface of the body of the module and electrically connected to the electronic circuitry of the module; a page scroll key mounted in the upper surface of the body of the module and electrically connected to the electronic circuitry of the module; a display mounted in the upper surface of the body of the module and electrically connected to the electronic circuitry of the module; an electrical connector electrically connected to the electronic circuitry of the module and positioned to allow mating with the electrical connector of the terminal; and an appendage having upwardly extending latch means positioned to allow mating with the cavity means of the terminal; wherein physical attachment of the module to the terminal is achieved by engaging the latch means of the module with the cavity means of the terminal.

The invention may be summarized according to a third broad aspect as a telephone system comprising: a telephone terminal having a body comprising an upper surface and a lower surface; electronic circuitry housed within the body of the terminal; a plurality of keys mounted in the upper surface of the body of the terminal and electrically connected to the electronic circuitry of the terminal; a display mounted in the upper surface of the body of the terminal and electrically connected to the electronic circuitry of the terminal; an electrical connector electrically connected the electronic circuitry of the terminal for electrical connection to a supplemental module; and cavity means on an underside of the terminal; a stand for supporting the terminal at a selectable elevation angle; and an attachable module having a body comprising an upper surface and a lower surface; electronic circuitry housed within the body of the module; a plurality of function keys mounted in the upper surface of the body of the module and electrically connected to the electronic circuitry of the module; a page scroll key mounted in the upper surface of the body of the module and electrically connected to the electronic circuitry of the module; a display mounted in the upper surface of the body of the module and electrically connected to the electronic circuitry of the module; an electrical connector electrically connected to the electronic circuitry of the module and positioned to allow mating with the electrical connector of the terminal; and an appendage having upwardly extending latch means positioned to allow mating with the cavity means of the terminal; wherein physical attachment of the module to the terminal is achieved by engaging the latch means of the module with the cavity means of the terminal.

According to a fourth broad aspect, the invention provides an attachable module for expanding or enhancing the functionality of a telephone terminal which contains electronic circuitry, the module comprising: a body having an upper surface and a lower surface; electronic circuitry housed within the body and consisting of at least one microprocessor running software; a plurality of function keys mounted in the upper surface of the body and electrically connected to the electronic circuitry of the module; a display mounted in the upper surface of the body and having an edge portion adjacent the plurality of function keys, the display being electrically connected to the electronic circuitry of the module and presenting adjacent respective ones of the function keys descriptors related to the functions carried out by the keys; an appendage for physically connecting the module to the terminal; and an electrical connector for electrically connecting the electronic circuitry of the module to the electronic circuitry of the terminal.

BRIEF DESCRIPTION OF THE DRAWING

The preferred embodiment of the present invention will now be described with reference to the attached drawings, in which:

FIG. 4 is a side view, looking in the direction of arrow 4 in FIG. 3, of an add-on module in accordance with the present invention;

FIG. 5 is a bottom view of the module of FIG. 4;

DETAILED DESCRIPTION OF THE PREFERRED EMBODIMENT

Figure 1:
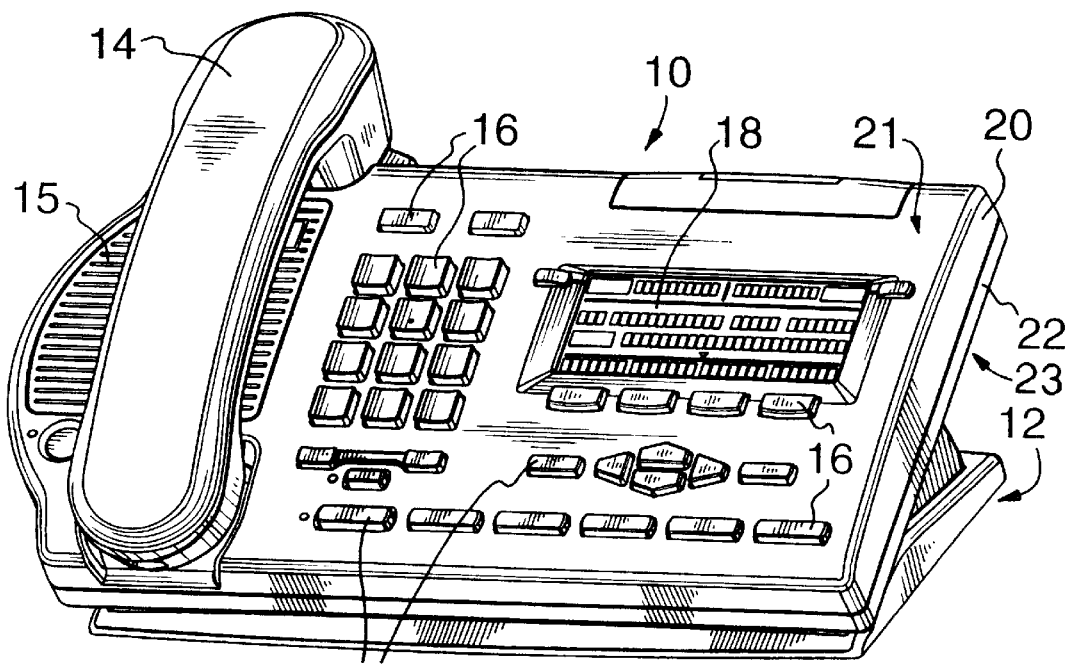
FIG. 1 is a front perspective view of a desktop terminal on a stand.

Referring to FIG. 1, there is shown a front perspective view of a desktop telephone terminal 10 mounted on a stand 12 made of molded plastic. The telephone terminal comprises, amongst other elements, a handset 14, various keys 16, a display 18 and a body, also made of molded plastic, having an upper housing half 20 and a lower housing half 22 with respective upper 21 and lower 23 surfaces. The handset 14, keys 16 and display 18 are connected to electronic circuitry (not shown) contained within the body of the terminal 10. The electronic circuitry typically allows the desktop terminal to function when it is connected to a telephone line in a wall jack, and consists of components ranging from electrical connectors to processors running software. The stand 12 is optional and can be used to support the terminal 10 at a selectable angle that generally ranges from 22 to 45 degrees relative to a surface, such as a desk, on which the stand is laid.

Figure 2:
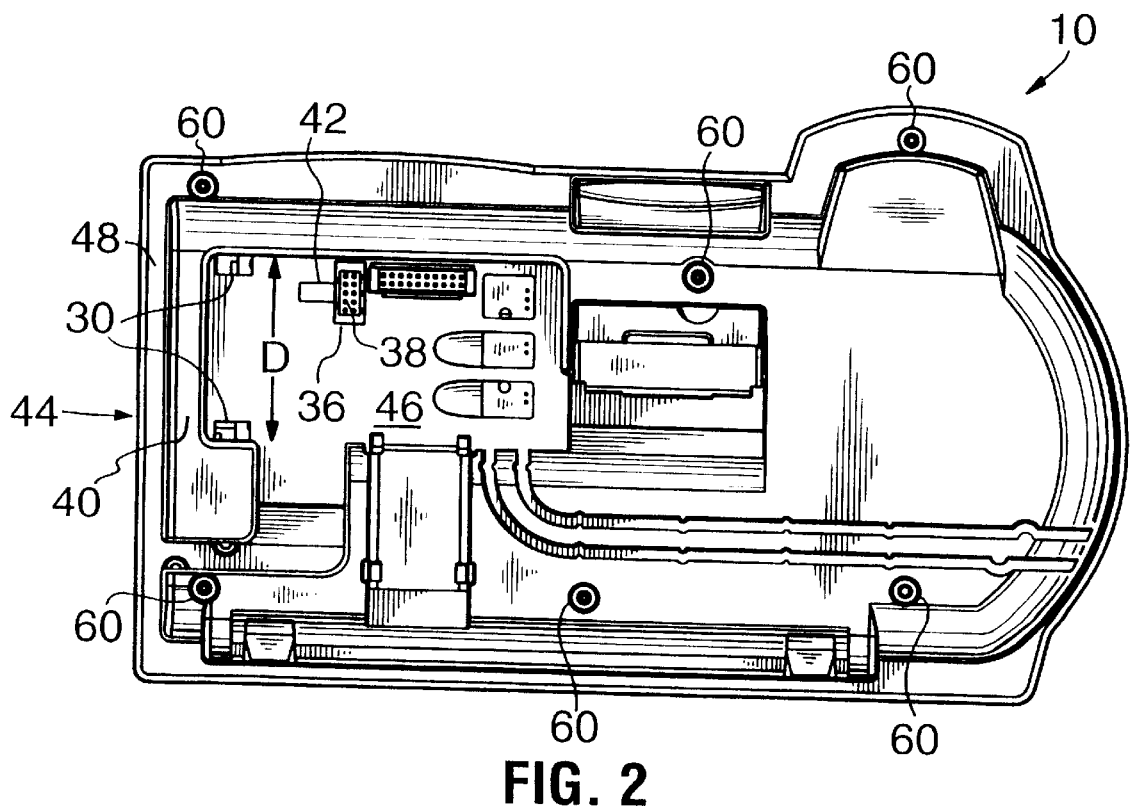
FIG. 2 is a bottom view of the terminal of FIG. 1 when removed from the stand.
Figure 3:
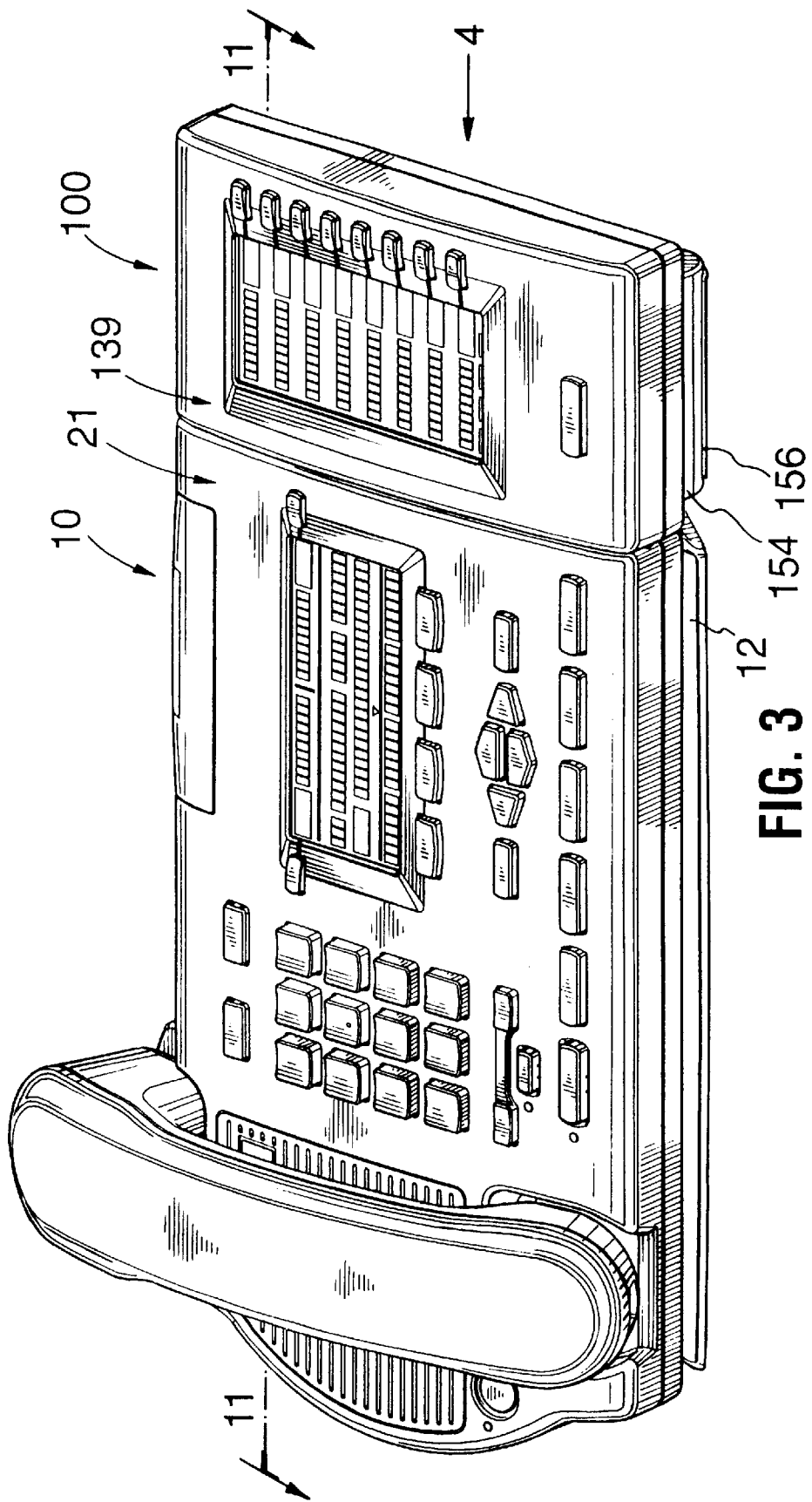
FIG. 3 is a front perspective view of a terminal and an add-on module connected together in accordance with the present invention.

FIG. 2 is a bottom view of the terminal 10, wherein several screws 60 for holding together the upper and lower housing halves of the terminal can be identified. Also shown are latching cavities 30 that mate with protrusions on an add-on module thereby permitting attachment of such a module 100 to a side 44 of the terminal 10, as shown in FIG. 3 and described in more detail hereinafter. Inside an electrical connection cavity 36 is located a ten-pin male electrical connector 38 which can be used to access the internal electronic circuitry of the terminal 10. The electrical connection cavity 36 also comprises a groove 42, oriented towards the side 44 of the terminal, providing clearance for a complementary electrical connector (described later) on the module.

The latching cavities 30 and electrical connection cavity 36 are all located within a recessed portion 46 of the terminal 10 that is separated from an edge 48 on the side 44 of the terminal by a rib 40. Preferably, the recessed portion 46 is not as deep as the edge 48, i.e., the rib 40 is thicker near the edge 48 than it is near the recessed portion 46. It is to be understood that the underside of the terminal 10 has many protrusions, grooves, recesses, etc. formed for purposes other than for permitting mating of an add-on module and as such will not be described.

Aside from enabling conventional two-way telephone conversations, a modern desktop terminal like the one illustrated gives the user extensive control over his or her communication environment. A handsfree button may be present among the keys 16, which bypasses the handset 14 by achieving two-way communications via a speakerphone 15. Moreover, some keys may activate traditional telephony features such as automatic redial, call hold, call release, call forward, call park, mute, conference call and voice messaging. In addition, a certain number of keys may be reserved for speed calling and for access to separate external or internal telephone lines.

The electronic circuitry within the body of the terminal 10 is responsible for providing proper signals to the telephone company in order to execute the functions selected by the user. It will also interpret data from the telephone company, such as news, advertisements or the number from which a received call has been placed, and visually represent them in a suitable format on the display 18. Upon the user dialling a number or accessing a function, the display 18 also serves to indicate to the user the dialled number or chosen function. The software running on the processors in the electronic circuitry controls the signalling and display, and performs tasks such as memory management for storing voice messages or "speed call" numbers.

Reference is now made to FIGS. 4 through 10, illustrating the add-on module 100 in accordance with the present invention. The module 100 comprises a body, preferably made of molded plastic, featuring generally rectangular upper 138 and lower 140 housing halves held together by a number of screws 136. At opposite ends of the body are exposed upper 139 and lower 141 surfaces, respectively formed as the outer surfaces of the upper 138 and lower 140 housing halves, as best seen in FIG. 4.

Molded integrally with the lower housing half 140 of the module is a slab 132 of generally rectangular shape whose width is approximately equal to that of the lower housing half but having a somewhat inferior length. The slab 132 is shifted laterally towards an edge 142 of the body, leaving a majority of the slab in contact with the lower surface 141, and simultaneously forming an upwardly facing shoulder 133 (best seen in FIGS. 7 and 8) that runs along the edge 142 in a plane generally parallel to the upper and lower surfaces 139 and 141. A principal function of the shoulder 133 is to support the edge 48 of the terminal 10 upon connection of the module to the terminal.

The add-on module 100 also comprises a display 106, various function keys 110 and a scroll key 112, all mounted within suitable cavities (not shown) in the upper housing half 138 and connected to internal electronic circuitry contained within the body of the module. The display 106 is preferably a rectangular, liquid crystal display (LCD) screen as known in the art, and the function keys 110 and scroll key 112 are conventional plastic buttons. The electronic circuitry typically includes electrical connectors and a microprocessor running software.

In a preferred embodiment, there are eight aligned rectangular function keys positioned relatively close to the display 106. However, the present invention is in no way limited by the number of keys or by their illustrated size, shape or configuration relative to the display 106. For example, a design of equivalent functionality and inventiveness would comprise a set of elliptical keys surrounding the display.

It is also noteworthy that the upper 138 and lower 140 housing halves are not necessarily solid blocks of plastic, but rather conform to shapes that are suitable for housing the electronic circuitry, keys and display. Similarly, the slab 132 may in large part be hollow, thus increasing the volume of the body and permitting the storage of more electronic circuitry. Moreover, the shoulder 133 maintains its functionality regardless of whether that portion of the slab 132 is made from a homogeneous piece of plastic or from a series of coplanar ribs.

Figure 6:
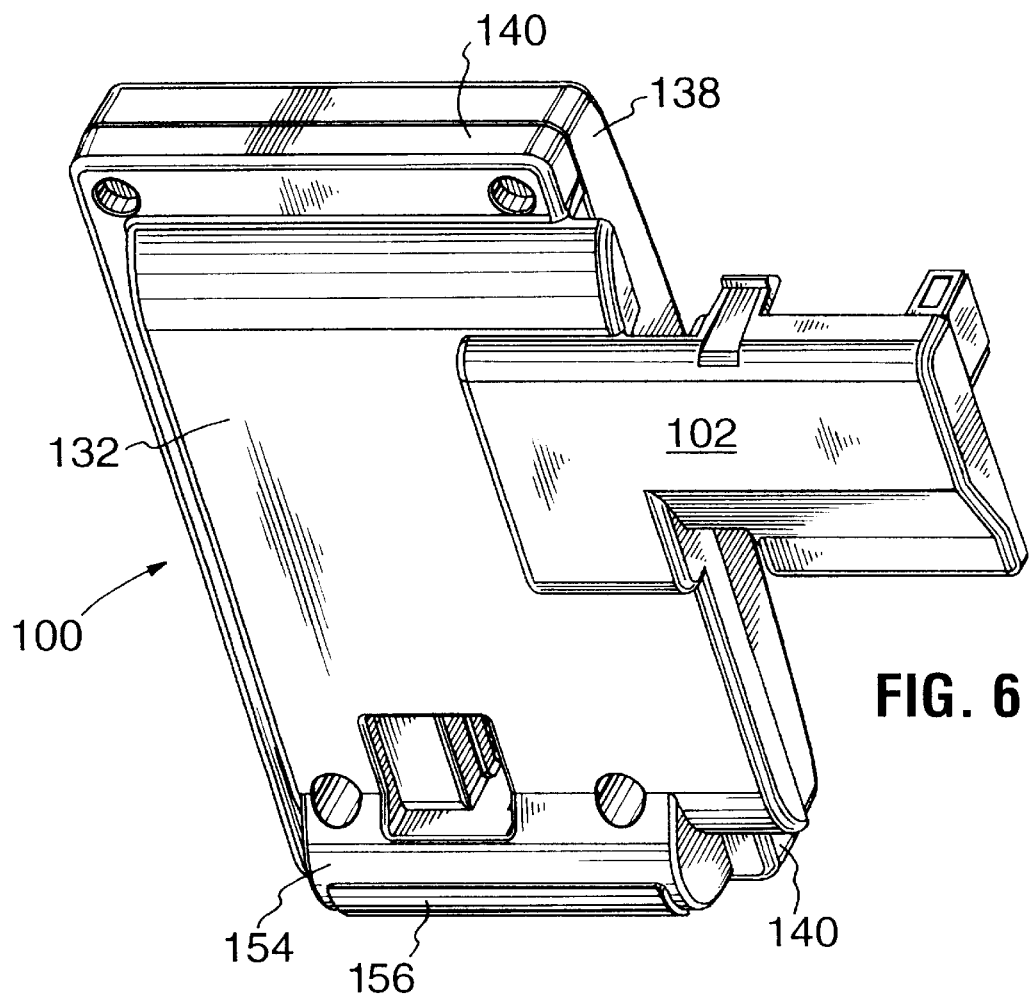
FIG. 6 is a bottom perspective view of the module of FIG. 4.

A rounded protrusion 154, best seen in FIG. 6 and on which is attached a soft rubberized pad 156, is integrally molded with the slab 132 and with the lower housing half 140 of the module. It is located towards a lower edge 144 (shown in FIG. 4) of the module that is meant to come into contact with the top surface of a desk once the module is joined with the terminal 10. The pad 156 thus protects the add-on module and the desk from being damaged as the combination of terminal and module is periodically moved or rotated by the user.

The shape, position and thickness of the protrusion 154 are particularly important since it is advisable to ensure contact of the pad 156 with the surface of the desk at all elevation angles of the terminal and module that the stand (in FIG. 1) is capable of supporting. As previously discussed, this angle usually ranges from 22 to 45 degrees relative to the desk. Accordingly, as seen in FIG. 4, the protrusion 154 is rounded in the shape of an arc 155 of approximately seventy-five degrees, ensuring good contact of the pad with the desk for elevation angles of zero to 75 degrees and acting as a pivot when the elevation angle is changed. The protrusion must also be placed sufficiently close to the edge 144 and have sufficient thickness so as to prevent this edge from coming into contact with the surface as the elevation angle is increased.

Figure 7:
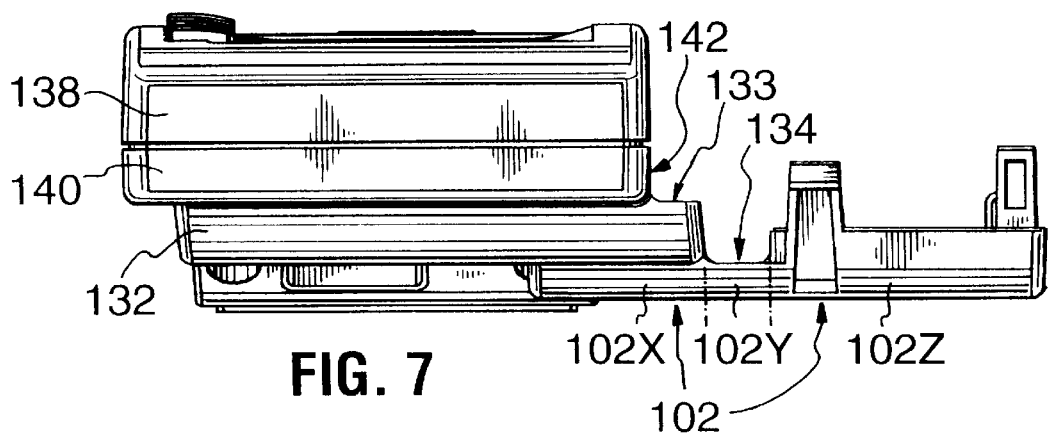
FIG. 7 is an end view of the module of FIG. 4, looking in the direction of arrow 7.
Figure 8:
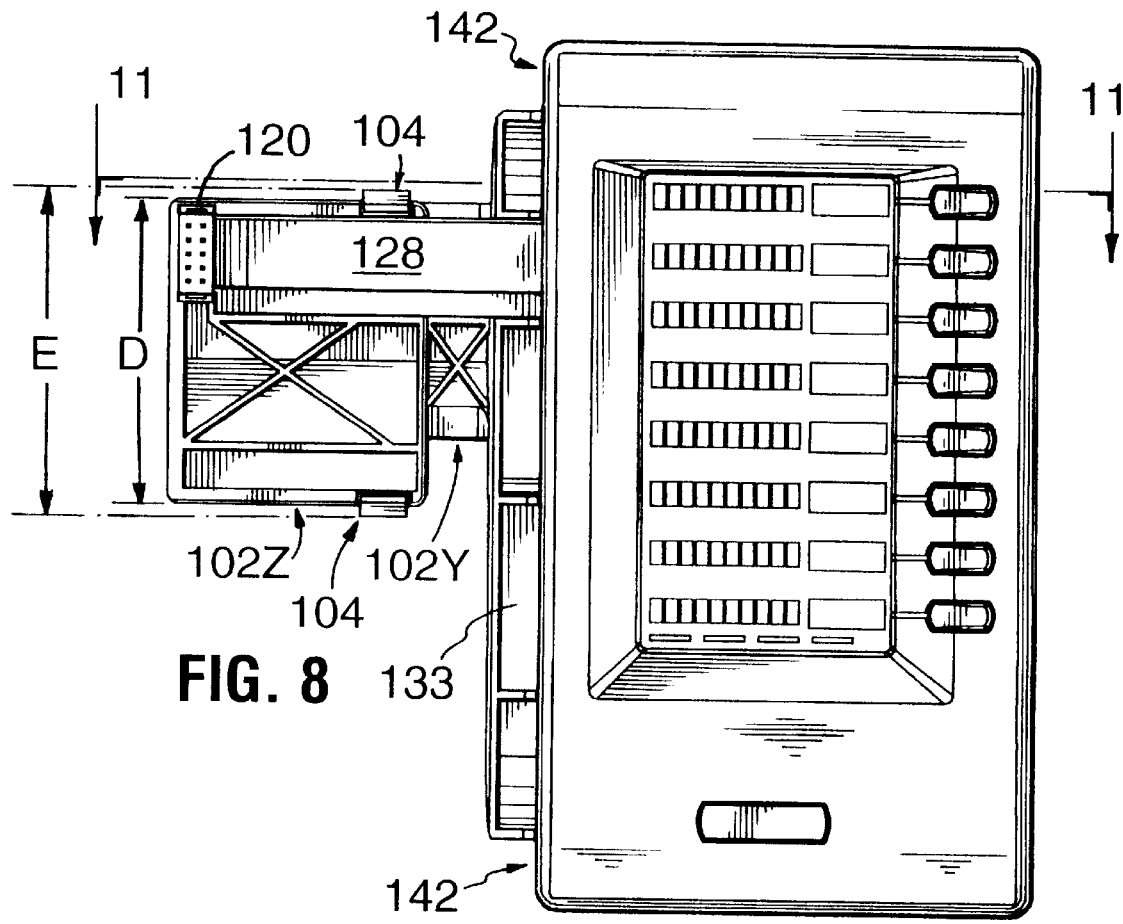
FIG. 8 is a top view of the module of FIG. 4.
Figure 11:
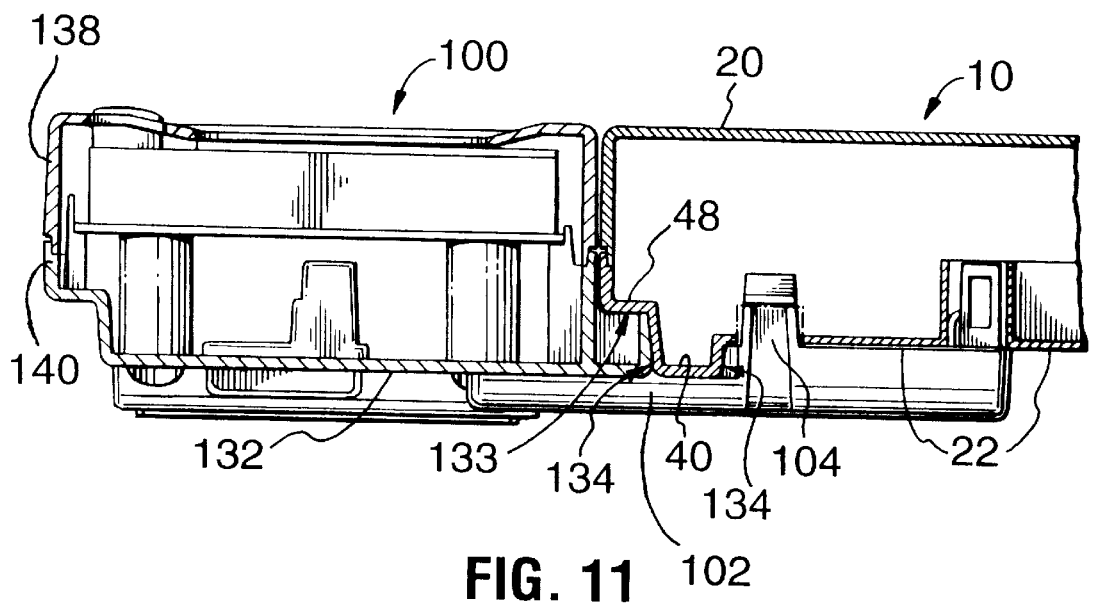
FIG. 11 is a cross-sectional view of the module and part of the terminal taken along line 11—11 in FIGS. 3 and 8.

Molded with the slab 132 and projecting even further from edge 142 is an appendage 102, comprised of two main sections 102X,102Z and a bridge 102Y of varying dimensions, as seen in FIGS. 5, 7 and 8. Section 102X is in direct contact with the slab 132. Section 102Z is approximately of the same width as section 102X, although somewhat longer and thicker. Bridge 102Y extends past the slab 132, joining section 102Z to section 102X and is slightly narrower than its neighbors, thereby allowing increased flexibility of section 102Z. Moreover, as seen in FIG. 7, the bridge 102Y is of the same thickness as section 102X, and therefore a channel 134 is created between an edge of the slab 132 and section 102Z of the appendage 102, which, as will be discussed below, accommodates the rib 40 of the terminal 10 upon attachment (FIG. 11).

Figure 9:
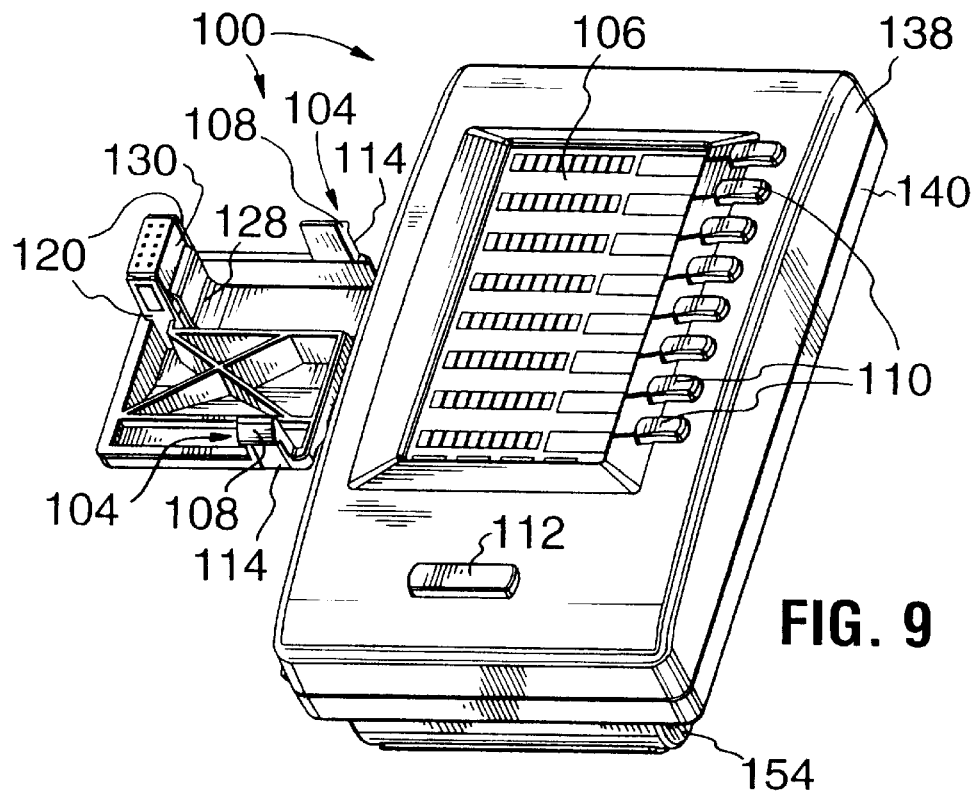
FIG. 9 is a front perspective view of the module of FIG. 4.

In FIGS. 8 and 9, section 102Z is shown to comprise a pair of protrusions 104 proximate the bridge 102Y for attachment of the module 100 to the terminal 10, as well as a pair of holders 120 at the far end for supporting a ten-hole female electrical connector 130. In the preferred embodiment, the protrusions 104 have outer edges 114 that are spaced apart by a distance approximately equal to "D" (also shown next to the latching cavities 30 in FIG. 2). Each protrusion 104 comprises a triangular tooth 108 whose maximum thickness is slightly greater than that of the protrusion, thereby creating a shoulder for engagement in a latching cavity 30 of the terminal. The two teeth 108 point away from each other so that the distance "E" between the tips of the teeth 108 will be larger than "D". The plastic from which the protrusions are made is flexible enough to allow these to be bent towards each other to temporarily make the distance between the tips of the teeth 108 slightly less than "D" without cracking.

Figure 10:
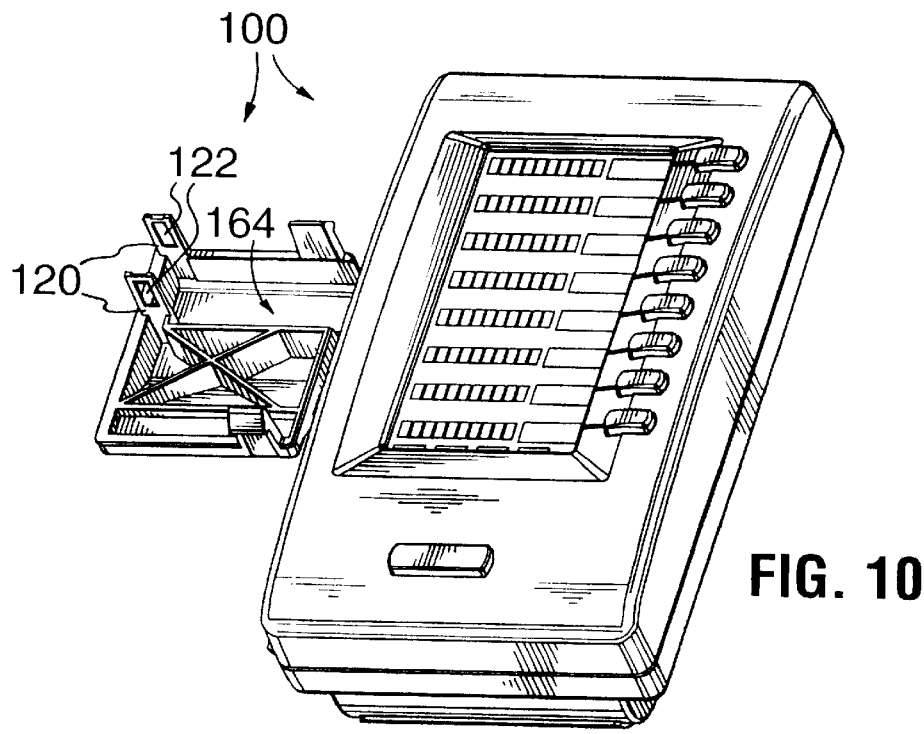
FIG. 10 is a front perspective view of the module of FIG. 4 with the electrical connector removed.

The ten-hole female electrical connector 130 is used to access the internal electronic circuitry of the add-on module 100 via a set of insulated conductors arranged as a ribbon 128. A channel for securing the ribbon 128, leading from the holders to the electronic circuitry and partially visible in FIG. 10, is formed in section 102Z, bridge 102Y and the shoulder 133 of the slab 132.

The connector 130 comprises two small projections (not shown), which are inserted into respective apertures 122 in the holders 120. The plastic from which the holders 120 are made must therefore be sufficiently flexible to accommodate some parting so as to allow proper insertion of the connector 130. The female electrical connector 130 is compatible with the male electrical connector 38 on the underside of the terminal 10 such that, upon interfacing of both connectors, an electrical connection is established between the electronic circuitry in the terminal 10 and that in the add-on module 100.

It is to be understood that the electrical connection may be established according to several variations, in which the number of connectors may be greater or smaller than ten (the amount illustrated), or in which the male and female electrical connectors appear respectively on the add-on module and terminal rather than as in the current arrangement. The connection itself may differ by virtue of resembling a slot-based card connection commonly found in personal computers.

In FIG. 5, a recessed portion 150 of the slab 132 and protrusion 154 can be identified. A deeper electrical connection cavity 150A is located within this recessed portion 150 and penetrates the slab 132 and the lower housing half 140 of the module, allowing the internal circuitry to be accessed via a ten-pin female electrical connector 152. This permits electrical connection of an additional functional unit to the module 100.

Before physically coupling the add-on module to the terminal, the connector 130 must be secured by the holders 120. A suitable way to install the connector 130 is to slightly separate the holders 120 and position the connector 130 between the holders so that the protrusions (not shown) on the connector 130 fit into the respective apertures 122 in the holders 120. One must then align the protrusions 104 with the latching cavities 30 and the female electrical connector 130 with the male electrical connector 38. Meanwhile, the bridge 102Y of the appendage 102 should be aligned with the rib 40 of the terminal 10.

Next, the protrusions 104 are to be bent so that the tips of the teeth 108 span a distance slightly less than "D"; due to the triangular shape of the teeth, this can be done simply by pressing the aligned module 100 against the lower housing half 22 of the terminal 10. Once the teeth 108 have slid into their respective latching cavities 30 and an electrical connection has been established, the add-on module 100 is said to be in an attached state. FIG. 11 is a cross-sectional view of the attached module and terminal along the 11—11 line in FIGS. 3 and 8, and shows the protrusions 104 now located within the body of the terminal 10, i.e., coupled to the lower housing half 22 behind the display 18. The rib 40 of the terminal is shown received in the channel 134 of the appendage 102 and the shoulder 133 of the slab 132 supports the edge 48 of the terminal 10, thereby providing a strong, stable mechanical connection.

As can be seen in FIG. 3, the attached module 100 appears as a natural extension of the terminal 10. In particular, the edge 142 of the module is flush with the side 44 of the terminal and the upper 21 and lower 23 surfaces of the terminal are substantially continued by the upper 139 and lower 141 surfaces of the module, respectively. As the stand 12 does not extend past the terminal, support for the module is provided by the protrusion 154 (and pad 156), whose rounded shape, position close to the edge 144 and relative thickness all contribute to ensuring contact of the pad 156 with the surface on which the combination of terminal and module is placed.

Once in an attached state, it is not anticipated that the add-on module 100 would be removed from the terminal 10 on a frequent basis. Nevertheless, detachment may be necessary to effect repairs or when the add-on module 100 contains sensitive information in memory. There are several ways to remove the add-on module 100 from the terminal 10, each of which involves accessing the protrusions 104 inside the body of the terminal 10, bending them towards each other and dislodging the add-on module 100 from the terminal 10. Specifically, the protrusions 104 are to be squeezed together so that at least one of them slips out of its respective latching cavity 30, at which point the module can be withdrawn from underneath the terminal. In order to access the protrusions 104 located within the body of the terminal 10, it may be necessary to remove the display 18. Alternatively, a lever can be designed into the terminal 10 such that the protrusions 104 can be bent towards each other without having to remove the display.

It is to be understood that many viable options exist for connection of the add-on module 100 to the terminal 10, without departing from the spirit of the invention. The protrusions 104 and latching cavities 30 may be replaced by a suitable mechanical fastener that is released with relative ease. In the interest of keeping installation efforts to a minimum, however, a simple solution involving no extra parts is envisaged. Nevertheless, even when a tooth-based approach such as the one documented here is adopted, many possibilities exist for attaching the add-on module 100 to the terminal 10, combining various sizes and locations of the protrusions and cavities. For example, there may be only one large cavity into which fit a number of toothed protrusions.

Operation of the add-on module 100 in the attached state is now described. Once an electrical connection has been established, the software running on processors forming part of the electronic circuitry of the add-on module 100 will present images to the user on the display 106 in the form of a "page". Preferably, next to each function key 110, there will be a descriptor on the page identifying the function associated with each key. In a speed calling context, this descriptor may be the name of a person or company whose number is dialled upon depressing the adjacent key. In other instances, the descriptor may identify the function corresponding to a key with a graphic icon or the actual name of the function itself, such as "PARK", "CONFERENCE", and so on. In light of the above, it is therefore preferable that the display be capable of representing pages of alphanumeric and graphical data.

An important feature of the add-on module is the scroll key 112, which allows the user to change the functions currently associated with the function keys 110 by advancing to another page. Although the number of available functions that a user can choose from on a given page is limited to the number of buttons (being eight in the illustrated embodiment), the number of pages can be set to an arbitrarily large value. An optimal number of pages and an efficient distribution of functions on each page can be determined by experimenting with various implementations of the software algorithm, an important consideration being the provision of quick and easy access to functions for the user. In practice, it has been found that employing three pages, yielding a total of 24 functions with 8 keys, provides adequate functionality alongside low cost and user friendliness.

The names and numbers of people on the speed call list or particular icons corresponding to certain functions can be chosen and entered into memory by the user, usually during an initial setup session. Instructions appearing on the display of the terminal during the setup session guide the user through various programming steps that involve pressing a combination of keys on the module and/or the terminal.

There are still further advantages and properties of the inventive add-on module that have been heretofore unimaginable by users of conventional attachable modules. For example, the inventive add-on module allows the telephone service provider to display available features, such as call forwarding or conference call, on the display. Consequently, in a workgroup environment, for example, identical modules can be distributed to users across all workgroups despite differences in the features required in each group. In contrast, regular modules are disadvantaged in that users themselves must stay abreast of currently available features in their group, entailing the inconvenience of changing the paper labels.

Moreover, there are also cases in which various users of the same add-on module may desire distinct sets of pages containing different functions. This may be addressed by the provision of a password protection mechanism in the software. Furthermore, one skilled in the art will find it trivial to write software program code that generates language-specific descriptors.

While the preferred embodiment of the present invention has been described and illustrated, it will be apparent to one skilled in the art that numerous modifications and variations are possible. The scope of the invention, therefore, is only to be limited by the claims appended hereto.

We claim:

1. An attachable module for expanding or enhancing the functionality of a telephone terminal which contains electronic circuitry, the module comprising:
   a body having an upper surface and a lower surface;
   electronic circuitry housed within the body and consisting of at least one microprocessor running software;
   a plurality of function keys mounted in the upper surface of the body and electrically connected to the electronic circuitry of the module;
   a page scroll key mounted in the upper surface of the body and electrically connected to the electronic circuitry of the module;
   a display mounted in the upper surface of the body and electrically connected to the electronic circuitry of the module;
   an appendage for physically connecting the module to the terminal; and
   an electrical connector for electrically connecting the electronic circuitry of the module to the electronic circuitry of the terminal.

2. The module of claim 1, wherein the appendage extends from a side of the body and has upwardly extending latch means engageable with cavity means in an underside of the terminal, thereby to physically connect the module adjacent a side of the terminal.

3. The module of claim 2, wherein the electrical connector is mounted on the appendage, thereby to mate with an electrical connector in the underside of the terminal when the module is physically connected to the terminal.

4. The module of claim 3, wherein the appendage comprises a pair of upwardly extending flexible holders for securing the electrical connector.

5. The module of claim 2, wherein the latch means comprises at least one flexible protrusion, each protrusion being integral with the appendage at one end and having a triangular tooth at another end, the tooth defining a shoulder for latching in the terminal cavity means.

6. The module of claim 5, wherein the latch means comprises two spaced flexible protrusions.

7. The module of claim 3, wherein the latch means comprises at least one flexible protrusion, each protrusion being integral with the appendage at one end and having a triangular tooth at another end, the tooth defining a shoulder for latching in the terminal cavity means.

8. The module of claim 2, wherein the appendage is connected to the side of the body by a relatively narrow bridge portion which permits flexibility of the appendage relative to the body.

9. The module of claim 8, wherein the latch means is located proximate the bridge portion and the electrical connector is located remote from the bridge portion.

10. The module of claim 9, wherein the electrical connector is connected to the electronic circuitry of the module by a plurality of insulated conductors arranged as a ribbon.

11. The module of claim 10, wherein the ribbon rests in a channel formed in the appendage.

12. The module of claim 2, wherein the body is shaped so as to form a shoulder running along the side of the body such that the bridge portion extends past the shoulder and the shoulder supports an edge on an underside of the terminal upon attachment of the module to the terminal.

13. The module of claim 12, wherein the bridge portion is thinner than the appendage and the shoulder, thereby forming a channel for reception of a rib on the underside of the terminal upon attachment of the module to the terminal.

14. The module of claim 2, further comprising:
   a rounded protrusion integral with the lower surface of the body and located proximate a lower end of the module so as to form a pivot when angular elevation of the module is changed; and
   a soft pad mounted on the protrusion for mutual protection of the lower end of the module and a surface when the lower end of the module is laid upon the surface.

15. The module of claim 14, wherein the upper and lower surfaces, the appendage, the latch means and the rounded protrusion are made of molded plastic.

16. The module of claim 1, wherein the display is of a liquid crystal display (LCD) type.

17. The module of claim 1, wherein the display provides a visual indication of telephony functions associated with each function key.

18. The module of claim 1, wherein the function keys are aligned and positioned relatively close to the display.

19. The module of claim 1, wherein a plurality of telephony functions are associated with each function key and the page scroll key selects which of the plurality of telephony functions associated with a particular function key is to be executed upon pressing said function key.

20. The module of claim 1, wherein the software is programmed so as to provide an initial setup page on the display, whereby descriptors corresponding to respective telephony functions associated with each function key can be selected by following instructions on the display.

21. The module of claim 1, wherein the software is programmed so as to provide a password protection mechanism for allowing a plurality of users to access respective distinct sets of telephony functions associated with each of the plurality of function keys.

22. The module of claim 1, wherein the software is programmed so as to provide information on the display in a plurality of languages.

23. A telephone system comprising:
   a telephone terminal having a body comprising an upper surface and a lower surface; electronic circuitry housed within the body of the terminal; a plurality of keys mounted in the upper surface of the body of the terminal and electrically connected to the electronic circuitry of the terminal; a display mounted in the upper surface of the body of the terminal and electrically connected to the electronic circuitry of the terminal; an electrical connector electrically connected the electronic circuitry of the terminal for electrical connection to a supplemental module; and cavity means on an underside of the terminal; and
   an attachable module having a body comprising an upper surface and a lower surface; electronic circuitry housed within the body of the module; a plurality of function keys mounted in the upper surface of the body of the module and electrically connected to the electronic circuitry of the module; a page scroll key mounted in the upper surface of the body of the module and electrically connected to the electronic circuitry of the module; a display mounted in the upper surface of the body of the module and electrically connected to the electronic circuitry of the module; an electrical connector electrically connected to the electronic circuitry of the module and positioned to allow mating with the electrical connector of the terminal; and an appendage having upwardly extending latch means positioned to allow mating with the cavity means of the terminal;
   wherein physical attachment of the module to the terminal is achieved by engaging the latch means of the module with the cavity means of the terminal.

24. The system of claim 23, wherein the electrical connector of the terminal is mounted on the underside of the terminal and the electrical connector of the module is mounted on the appendage, thereby establishing an electrical connection between both electrical connectors when a physical connection is made.

25. The system of claim 23, wherein the latch means of the module comprises at least one flexible protrusion, each protrusion being integral with the appendage at one end and having a triangular tooth at another end, the tooth defining a shoulder for latching in the terminal cavity means.

26. The system of claim 25, wherein the latch means of the module comprises two spaced flexible protrusions.

27. The system of claim 23, wherein the appendage is connected to the side of the body by a relatively narrow bridge portion which permits flexibility of the appendage relative to the body.

28. The system of claim 27, wherein the latch means of the module is located proximate the bridge portion of the appendage and the electrical connector of the module is located remote from the bridge portion of the appendage.

29. The system of claim 23, wherein the body of the module is shaped so as to form a shoulder running along the side of the body such that the bridge portion extends past the shoulder and the shoulder supports an edge on the underside of the terminal upon attachment of the module to the terminal.

30. The system of claim 29, wherein the bridge portion is thinner than the appendage and the shoulder, thereby forming a channel for reception of a rib on the underside of the terminal upon attachment of the module to the terminal.

31. The system of claim 23, the module further comprising:
a rounded protrusion integral with the lower surface of the body and located proximate a lower end of the module so as to form a pivot when angular elevation of the module is changed; and
a soft pad mounted on the protrusion for mutual protection of the lower end of the module and a surface when the lower end of the module is laid upon the surface.

32. The system of claim 31, wherein the body of the terminal, the body of the module, the appendage, the bridge, the latch means and the rounded protrusion are made of molded plastic.

33. The system of claim 23, wherein a plurality of telephony functions are associated with each function key and the page scroll key selects which of the plurality of telephony functions associated with a particular function key is to be executed upon pressing said function key.

34. A telephone system comprising:
a telephone terminal having a body comprising an upper surface and a lower surface; electronic circuitry housed within the body of the terminal; a plurality of keys mounted in the upper surface of the body of the terminal and electrically connected to the electronic circuitry of the terminal; a display mounted in the upper surface of the body of the terminal and electrically connected to the electronic circuitry of the terminal; an electrical connector electrically connected the electronic circuitry of the terminal for electrical connection to a supplemental module; and cavity means on an underside of the terminal;
a stand for supporting the terminal at a selectable elevation angle; and
an attachable module having a body comprising an upper surface and a lower surface; electronic circuitry housed within the body of the module; a plurality of function keys mounted in the upper surface of the body of the module and electrically connected to the electronic circuitry of the module; a page scroll key mounted in the upper surface of the body of the module and electrically connected to the electronic circuitry of the module; a display mounted in the upper surface of the body of the module and electrically connected to the electronic circuitry of the module; an electrical connector electrically connected to the electronic circuitry of the module and positioned to allow mating with the electrical connector of the terminal; and an appendage having upwardly extending latch means positioned to allow mating with the cavity means of the terminal;
wherein physical attachment of the module to the terminal is achieved by engaging the latch means of the module with the cavity means of the terminal.

35. The system of claim 34, wherein the electrical connector of the terminal is mounted on the underside of the terminal and the electrical connector of the module is mounted on the appendage, thereby establishing an electrical connection between both electrical connectors when a physical connection is made.

36. The system of claim 34, wherein the latch means of the module comprises at least one flexible protrusion, each protrusion being integral with the appendage at one end and having a triangular tooth at another end, the tooth defining a shoulder for latching in the terminal cavity means.

37. The system of claim 36, wherein the latch means of the module comprises two spaced flexible protrusions.

38. The system of claim 34, wherein the appendage is connected to the side of the body by a relatively narrow bridge portion which permits flexibility of the appendage relative to the body.

39. The system of claim 38, wherein the latch means of the module is located proximate the bridge portion of the appendage and the electrical connector of the module is located remote from the bridge portion of the appendage.

40. The system of claim 34, wherein the body of the module is shaped so as to form a shoulder running along the side of the body such that the bridge portion extends past the shoulder and the shoulder supports an edge on the underside of the terminal upon attachment of the module to the terminal.

41. The system of claim 40, wherein the bridge portion is thinner than the appendage and the shoulder, thereby forming a channel for reception of a rib on the underside of the terminal upon attachment of the module to the terminal.

42. The system of claim 34, the module further comprising:
a rounded protrusion integral with the lower surface of the body and located proximate a lower end of the module so as to form a pivot when the elevation angle is changed; and
a soft pad mounted on the protrusion for mutual protection of the lower end of the module and a surface when the lower end of the module is laid upon the surface.

43. The system of claim 42, wherein the stand, the body of the terminal, the body of the module, the appendage, the bridge, the latch means and the rounded protrusion are made of molded plastic.

44. The system of claim 34, wherein a plurality of telephony functions are associated with each function key and the page scroll key selects which of the plurality of telephony functions associated with a particular function key is to be executed upon pressing said function key.

45. The system of claim 34, wherein the elevation angle supported by the stand is in the range of 22 to 45 degrees relative to a surface on which the stand is laid.

46. An attachable module for expanding or enhancing the functionality of a telephone terminal which contains electronic circuitry, the module comprising:
- a body having an upper surface and a lower surface;
- electronic circuitry housed within the body and consisting of at least one microprocessor running software;
- a plurality of function keys mounted in the upper surface of the body and electrically connected to the electronic circuitry of the module;
- a display mounted in the upper surface of the body and having an edge portion adjacent the plurality of function keys, the display being electrically connected to the electronic circuitry of the module and presenting adjacent respective ones of the function keys descriptors related to the functions carried out by the keys;
- an appendage for physically connecting the module to the terminal; and
- an electrical connector for electrically connecting the electronic circuitry of the module to the electronic circuitry of the terminal.

47. The module of claim 46, wherein the descriptors are names corresponding to speed dialled numbers.

48. The module of claim 46, wherein the descriptors are names or icons representing the actual functions of the keys.

49. The module of claim 46, further comprising a page scroll key mounted in the upper surface of the body and electrically connected to the electronic circuitry, whereby a plurality of pages of descriptors may be displayed.

* * * * *